(12) United States Patent
Whitehead et al.

(10) Patent No.: US 10,807,039 B2
(45) Date of Patent: Oct. 20, 2020

(54) BIODEGRADABLE WASTE REMEDIATION METHOD AND SYSTEM

(71) Applicant: CLEMSON UNIVERSITY, Clemson, SC (US)

(72) Inventors: Daniel Whitehead, Clemson, SC (US); Frank Alexis, Greenville, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 16/600,866

(22) Filed: Oct. 14, 2019

(65) Prior Publication Data

US 2020/0164308 A1   May 28, 2020

Related U.S. Application Data

(62) Division of application No. 15/012,991, filed on Feb. 2, 2016, now abandoned.

(60) Provisional application No. 62/110,876, filed on Feb. 2, 2015.

(51) Int. Cl.
*B01D 53/72* (2006.01)
*B01D 53/02* (2006.01)
*B01D 53/82* (2006.01)
*B01D 15/00* (2006.01)

(52) U.S. Cl.
CPC ............ *B01D 53/72* (2013.01); *B01D 15/00* (2013.01); *B01D 53/02* (2013.01); *B01D 53/82* (2013.01); *B01D 2251/21* (2013.01); *B01D 2253/202* (2013.01); *B01D 2253/25* (2013.01); *B01D 2257/556* (2013.01); *B01D 2257/708* (2013.01);

(Continued)

(58) Field of Classification Search
None
See application file for complete search history.

(56) References Cited

U.S. PATENT DOCUMENTS

| 3,673,110 A | 6/1972 | Edwards |
| 3,751,231 A | 8/1973 | Niedzielski |
| 3,946,101 A | 3/1976 | Harendza-Harinxma |

(Continued)

FOREIGN PATENT DOCUMENTS

| CN | 102247846 | 11/2011 |
| DE | 4209988 | 3/1993 |

(Continued)

OTHER PUBLICATIONS

Ajami, et al. "Chemical approaches for detection and destruction of nerve agents" *Org. Biomol. Chem.* 11 (2013) pp. 3936-3942.

(Continued)

*Primary Examiner* — Anita Nassiri-Motlagh
(74) *Attorney, Agent, or Firm* — Dority & Manning, P.A.

(57) ABSTRACT

Contaminant treatment methods and systems are described. Methods utilize biodegradable, non-toxic materials that can carry one or more functionalities useful for the remediation of fluids such as liquid or gaseous waste streams, chemical spills, etc. The carrier materials carry one or more functional groups that can target particular contaminants of a fluid for removal and/or modification to a more benign form. Targeted contaminants can include components of gaseous and/or liquids such as, and without limitation, gaseous discharges including VOCs and potentially hazardous contaminants such as organophosphorous compounds.

29 Claims, 6 Drawing Sheets

(52) U.S. Cl.
CPC .. *B01D 2258/02* (2013.01); *B01D 2258/0266* (2013.01); *B01D 2258/0275* (2013.01)

(56) References Cited

U.S. PATENT DOCUMENTS

| | | | |
|---|---|---|---|
| 4,157,376 | A | 6/1979 | Vulikh et al. |
| 4,374,814 | A | 2/1983 | Gaylord |
| 5,547,576 | A | 8/1996 | Onishi et al. |
| 6,339,039 | B1 | 1/2002 | Porath et al. |
| 7,988,860 | B2 | 8/2011 | Kalayci et al. |
| 8,420,038 | B2 | 4/2013 | England |
| 8,544,657 | B2 | 10/2013 | Chen et al. |
| 8,932,983 | B1 | 1/2015 | Harris et al. |
| 2006/0252848 | A1* | 11/2006 | Guillaume .......... A01M 1/2055 523/122 |
| 2007/0184158 | A1 | 8/2007 | Soane et al. |
| 2010/0113857 | A1* | 5/2010 | Ramakrishna .......... A61L 2/23 588/299 |
| 2010/0120315 | A1 | 5/2010 | Imashiro et al. |
| 2011/0104197 | A1 | 5/2011 | Morein et al. |
| 2011/0306115 | A1 | 12/2011 | Mulqueen et al. |
| 2013/0030154 | A1 | 1/2013 | Ait-Haddou et al. |
| 2013/0058724 | A1 | 3/2013 | John et al. |
| 2013/0126435 | A1 | 5/2013 | Berlin et al. |
| 2013/0306555 | A1 | 11/2013 | Chattopadhyay |

FOREIGN PATENT DOCUMENTS

| | | |
|---|---|---|
| JP | 2004105854 | 4/2004 |
| WO | WO 2009/042228 | 4/2009 |
| WO | WO 2012/170086 | 12/2012 |
| WO | WO 2014/033456 | 3/2014 |

OTHER PUBLICATIONS

Alexis, et al. "Some Insight into Hydrolytic Scissions Mechanisms in Bioerodible Polyesters" *J. Appl. Polym. Sci.* 102 (2006) pp. 3111-3117.

Alexis, F. "Factors affecting the degradation and drug-release mechanism of poly(lactic acid) and poly[(lactic acid)-co-(glycolic acid)]" *Polym. Int'l.* 54(1) (2005) pp. 36-46.

Aragay, et al. "Nanomaterials for Sensing and Destroying Pesticides" *Chem. Rev.* 112 (2012) pp. 5317-5338.

Bethea, et al. "Odor Controls for Rendering Plants" *Environ. Sci. Techn.* 7 (1973) pp. 504-510. (Abstract preview only).

Dastgheib, et al. "The effect of the physical and chemical characteristics of activated carbons on the adsorption energy and affinity coefficient of Dubinin equation" *J. Coll. Inter. Sci.* 292 (2005) pp. 312-321.

Greene, A.K. "Clemson Researchers Target Industry's Needs" *Render* (2014) pp. 28-29.

Jencks, W.P. "Studies on the Mechanism of Oxime and Semicarbazone Formation" *J. Am. Chem. Soc.* 81 (1959) pp. 475-481.

Karanfil, et al. "Trichloroethylene adsorption by fibrous and granular activated carbons: aqueous phase, gas phase, and water vapor adsorption studies" *Environ. Sci. Techn.* 38 (2004) pp. 5834-5841.

Kim, et al. "Destruction and Detection of Chemical Warfare Agents" *Chem. Rev.* 111 (2011) pp. 5345-5403.

Medina-Cleghorn, et al. "Multidimensional Profiling Platforms Reveal Metabolic Dysregulation Caused by Organophosphorus Pesticides" *ACS Chem. Bio.* 9 (2014) pp. 423-432.

Meeker, et al. "House Dust Concentrations of Organophosphate Flame Retardants in Relation to Hormone Levels and Semen Quality Parameters" *Environ. Health Persp.* 118 (2010) pp. 318-323.

Meeker, et al. "An Overview of the Rendering Industry" *Essential Rendering: All About the Animal By-Products Industry* Kirby Lithographic Co., Inc. (2006) pp. 1-16.

Morris, et al. "Organophosphorus Flame Retardants Inhibit Specific Liver Carboxylesterases and Cause Serum Hypertriglyceridemia" *ACS Chem. Bio.* 9 (2014) pp. 1097-1103.

Pridgen, et al. "Biodegradable, Targeted Polymeric Nanoparticle Drug Delivery Formulation for Cancer Therapy" *Methods in Bioengineering Book Series: Nanoscale Bioengineering and Nanomedicine* Artech House (2009) pp. 197-231.

Shareefdeen, et al. "An odor predictive model for rendering applications" *Chem. Eng. J.* 113 (2005) pp. 215-220.

Sindt, G.L. "Environmental Issues in the Rendering Industry" *Essential Rendering: All About the Animal By-Products Industry* Kirby Lithographic Co., Inc. (2006) pp. 245-258.

Smith, et al. "March's Advanced Organic Chemistry" 6th ed. *John Wiley & Sons, Inc.* (2007) pp. 359-364.

Travis, et al. "Preparation of purified $KHSO_5 \cdot H_2O$ and $nBu_4NHSO_5$ from oxone by simple and efficient methods" *Eur. J. Org. Chem.* (2002) pp. 3429-3434. (Abstract only).

Van Den Eede, et al. "Analysis of organophosphate flame retardant diester metabolites in human urine by liquid chromatography electrospray ionisation tandem mass spectrometry" *J. Chrom. A* 1303 (2013) pp. 48-53.

Van Der Veen, et al. "Phosphorus flame retardants: Properties, production, environmental occurrence, toxicity and analysis" *Chemosphere* 88 (2012) pp. 1119-1153.

Van Langenhove, et al. "Gas chromatography/mass spectrometry identification of organic volatiles contributing to rendering odors" *Environ. Sci.Techn.* 16(12) (1982) pp. 883-886.

Zengerle, et al. "Highly efficient cyclosarin degradation mediated by a β-cyclodextrin derivative containing an oxime-derived substituent" *Beilstein J. Org. Chem.* 7 (2011) pp. 1543-1554.

\* cited by examiner

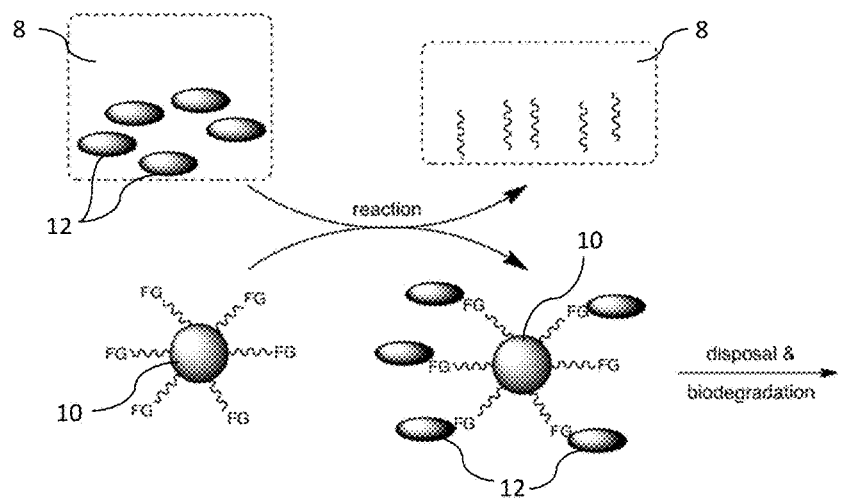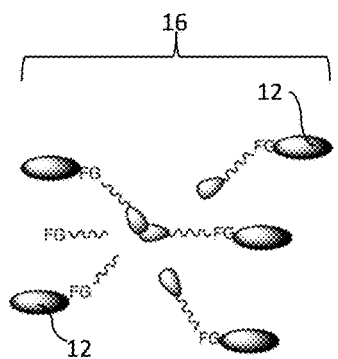
FIG. 1
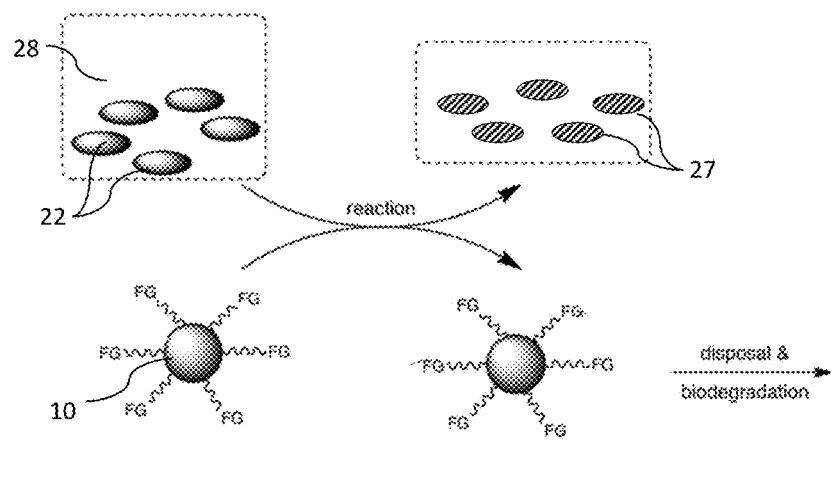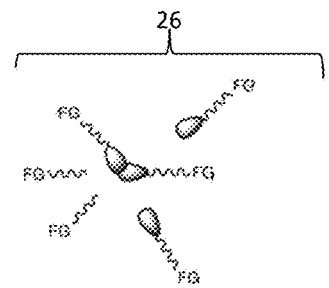
FIG. 2

*aldehydes:*

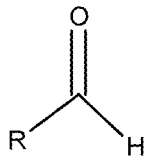

propanal
butanal
2-methylpropanal
2-methylbutanal
3-methylbutanal
pentanal
hexanal
heptanal
octanal
nonanal
decanal

*carboxylic acids:*

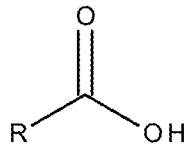

acetic acid
propionic acid
isobutyric acid
butyric acid
isovaleric acid
valeric acid
isocaproic acid
caproic acid

*amines*

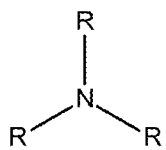

trimethylamine

*thiols, sulfides, disulfides, trisulfides:*

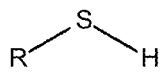 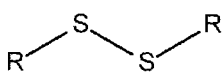

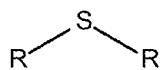 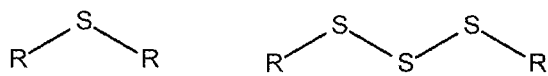

methanethiol
dimethyl sulfide
dimethyl disulfide
dimethyl trisulfides
methylpropl sulfide

FIG. 3

*alcohols:*

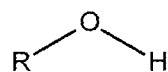

pentanol

BIODEGRADABLE WASTE REMEDIATION METHOD AND SYSTEM

CROSS REFERENCE TO RELATED APPLICATION

The present application is a divisional application of U.S. application Ser. No. 15/012,991, having a filing date of Feb. 2, 2016, which claims filing benefit of U.S. Provisional Patent Application Ser. No. 62/110,876, having a filing date of Feb. 2, 2015, both of which are incorporated herein by reference for all purposes.

BACKGROUND

The safe and effective remediation of waste or other environmental contaminants continues to provide challenges to industry growth and development, as well as to environmental safety. For example, volatile organic compounds (VOCs) emitted from processing plant waste in a variety of industries often produce noxious odors and can present deleterious health effects. These odors alone can prevent the construction of new facilities, even when the VOCs present little or no health or environmental hazards. Unfortunately, processes that produce malodorous by-products generally produce multiple different VOCs, and methods for eliminating a plurality of such compounds can be quite complicated and expensive.

There are many industries that produce VOCs as by-products, some examples include, but are not limited to: rendering, refining operations, landfills, waste-water treatment plants, paper mills, livestock farms, chemical plants, etc. Additionally, certain industrial food operations, such as industrial baking operations, coffee roasters, chocolate factories, chili sauce factories, etc., can present persistent nuisance odor problems for nearby residents.

As one example, rendering is a field that is strongly associated with the production of malodorous by-products, and is inextricably linked to the success and efficiency of the broader agricultural enterprise in the United States. The total output of materials from slaughterhouse operations not directly consumed by humans exceeds 54 billion pounds per year. Rendering processes cook down these by-products to drive off moisture, separate the animal fats, and concentrate the protein-rich material into dry meals, as well as other useful products. Rendering allows for the efficient removal, decontamination, and repurposing of the very large by-product stream from livestock and slaughterhouse operations. Alternative disposal strategies for slaughterhouse offal, including landfilling or incineration, pose serious environmental concerns in terms of the potential for water and soil contamination. In addition, these alternative methods don't remove, and can even exacerbate, the problem of the venting of noxious emissions.

The positive environmental impact of rendering in terms of reducing the amount of landfill and biological waste from the aforementioned operations is often overshadowed by negative perceptions of the environmental impact of rendering in terms of wastewater and odor emissions. Indeed, untreated emissions from rendering operations can be detected up to 20 miles away from the source, and concerns over odor emissions often play a large role in community resistance to site selection for new rendering operations. Significant efforts and capital have been invested into controlling odor emissions that result from this as well as other industries; however, room for improvement remains.

The handling of malodorous industrial by-products is not the only enterprise that could benefit from improved waste-treatment systems and methods. Organophosphorous (V) compounds represent a large class of compounds that are employed in a range of uses, including chemical warfare agents, pesticides, and flame retardants. If not properly handled and disposed of, these materials can be introduced into the environment as dangerous and even deadly toxins. Organophosphorous chemical warfare agents are deadly toxins that exhibit lethality by the inhibition of acetylcholine esterase resulting in continual nerve stimulation. Organophosphorous pesticides and herbicides such as chlorpyrifos, diazinon, and malathion enjoy broad use in agriculture and residential applications. Despite their reduced toxicity compared to chemical warfare agents, they still exhibit central nervous system toxicity and have been implicated in the advent of liver dyslipidemia in rodent models.

Organophosphorous flame retardants (OPFRs) like triphenyl phosphate (TPP), cresyldiphenylphosphate (CDPP), and 2-ethylhexyl diphenylphosphate (EHDP) are broadly applied in a variety of settings including furniture, textiles, vehicle interiors, electronics and computers, plastics, and building materials. OPFRs have been detected in many environmental settings including indoor air, dust, drinking water, and soil sediments, and often find their way into the waste stream.

While methods and materials have been developed to treat and/or remove contaminants such as VOCs and potentially toxic materials from waste streams, these methods are often elaborate and expensive, and the methods and materials used often present additional issues. For instance, known waste treatment materials generally lack specificity for contaminants, and as such, a large volume of treatment material can be required to ensure removal of the targeted contaminants. This can lead to additional disposal issues, as the secondary materials used to target the primary contaminants must also be removed, and a large volume of additional waste can be generated by the waste treatment process itself. Moreover, known waste treatment materials can present their own toxicity issues and are not biodegradable, adding additional problems to the waste treatment process.

What are needed in the art are materials, methods and systems for the remediation of environmental contaminants. For instance, biodegradable and non-toxic materials that can be utilized for the targeted chemical modification or sequestration of malodorous and/or environmentally harmful compounds would be of benefit.

SUMMARY

According to one embodiment, disclosed is a method for remediating a fluid. For instance, a method can include contacting a fluid (e.g., a liquid or a gaseous fluid) with a biodegradable carrier material. The fluid includes a contaminant that is targeted for removal and/or modification according to the remediation process such as a malodorous VOC or a toxic compound. The biodegradable carrier material includes a biodegradable polymer and also includes a functional group. The functional group has been predetermined for interaction with the targeted contaminant. The interaction between the functional group and the targeted contaminant can be, but not limited to, bonding between the targeted contaminant and the functional group by which the targeted contaminant can be sequestered and removed from the fluid or degraded or deactivated. In one embodiment, the interaction between the functional group and the target contaminant can be, but not limited to, formation of a covalent bond, formation of an ionic bond, electrostatic interaction, and or hydrophilic/hydrophobic interaction. In one embodiment, the interaction can be, but not limited to, low affinity but high avidity or high affinity but low avidity. In one embodiment, the interactions can be, but not limited to, monofunctional or multifunctional. In one embodiment, the interaction can include reaction of the targeted contaminant with the functional group by which the contaminant can be modified and thus rendered safe for disposal.

Also disclosed are systems containing the biodegradable carrier material that can be used in carrying out the disclosed methods. In one embodiment, a system can include a fluid flow path and the biodegradable carrier material located in the fluid flow path such that a fluid traveling in the path will contact the biodegradable carrier material. For example, the carrier material can be in the form of particles or fibers that can be a component of a fluidized bed, a filter apparatus, protective clothing, or some other device that can provide for contact between the carrier material and the fluid carried in the flow path. In one embodiment, the biodegradable carrier material can be inside, outside, and/or between membranes in a system.

BRIEF DESCRIPTION OF THE FIGURES

The presently disclosed subject matter may be better understood with reference to the Figures, of which:

FIG. 1 schematically illustrates a general strategy for a method as disclosed herein.

FIG. 2 schematically illustrates a general strategy for a method as disclosed herein.

FIG. 3 presents exemplary targeted materials from a rendering process for a method as disclosed herein.

DETAILED DESCRIPTION

Figure 4:
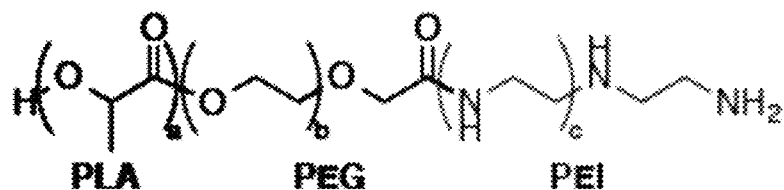
FIG. 4 illustrates a carrier material including an amine functional group.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

In general, the present disclosure is directed to the utilization of biodegradable, non-toxic materials that can carry one or more functionalities useful for the remediation of fluids such as liquid or gaseous waste streams. More specifically, the carrier materials can carry one or more functional groups that can target particular components of a fluid for removal and/or modification to a more benign form. Targeted contaminants can include, but are not limited to, components of gaseous and/or liquid fluids such as, and without limitation, gaseous discharges including VOCs and potentially hazardous contaminants such as organophosphorous compounds.

General strategies of methods for remediating a fluid are illustrated in FIG. 1 and FIG. 2. Briefly, in the method of FIG. 1, a carrier material 10 is surface decorated with reactive functional groups (FGs). The functional groups FG react with and bind to target contaminants 12 contained within a fluid such as a waste stream 8. By considering the chemical reactivity of the target contaminant 12, the surface FGs of the carrier material 10 can be tuned to bind the target contaminants according to any suitable binding mechanism (e.g., a covalent or non-covalent binding mechanism, charge/charge interaction, etc.) and sequester the target contaminant 12. The waste stream 8 can thus be cleared of the target contaminant.

Beneficially, the carrier material 10 can be non-toxic and biodegradable, allowing for spent materials 16 to deteriorate after sequestration and removal of the target contaminant 12 from the waste stream 8. The target contaminant 12 can be concentrated as compared to the concentration of the target contaminant 12 in the waste stream 8 and disposed of or further processed as desired. For instance, in one embodiment the targeted contaminant 12 can require additional processing prior to final disposal. Due to the biodegradability of the carrier material 10, this further processing need not include a step for removal of the targeted material 12 from the carrier material 10 or any additional processing of the carrier material 10, as the carrier material is biodegradable and non-toxic, and thus, will present no serious disposal issues. Alternatively, should the targeted material 12 retain a useful value, the targeted material 12 can be recovered from the spent material 16 following degradation of the carrier material. Through sequestration and removal of the targeted material 12 by use of the non-toxic and biodegradable carrier material 10, the final volume of the spent material 16 following biodegradation can be limited to only the remaining breakdown products of the carrier material 10 (e.g., water and carbon dioxide) and the concentrated targeted material 12, which can simplify the recovery, reprocessing, and/or disposal of the targeted material 12.

In an alternative embodiment illustrated in FIG. 2, the functional groups FG of the carrier material 10 can be designed to react with the targeted material 22 of the fluid, e.g., a waste stream 28. Upon the reaction, the targeted material 28 can be modified to a more acceptable material 27. For example, the reaction can oxidize, reduce, or otherwise alter the targeted material 22 to form a non-toxic compound 27 that can be disposed of or released without additional processing. The spent material 26 can include only the biodegradation products of the carrier material 10 and the reaction products (if any) of the functional groups FG, which can be disposed of or reprocessed as desired.

The carrier material can include a biodegradable polymer encompassing homopolymers and copolymers and including, without limitation, linear polymers, branched polymers, monovalent polymers, multivalent polymers, random copolymers, block copolymers, grafted polymers, crosslinked polymers, etc., and can be in any suitable form for contact with the targeted material. For instance, while illustrated in FIG. 1 and FIG. 2 as a spherical particulate, it should be understood that the carrier material can be in any suitable form, shape, or size. By way of example and without limitation, the carrier material can be in the form of nano-sized and/or micro-sized particles. Particle shapes can be, e.g., spherical, cylindrical, polymorphic, star-shaped, platelets, ovoid, square, amorphous, or any other shape or mixtures of shapes. Carrier materials can alternatively be in the form of sheets or films, fibers, or any other convenient form.

Polymers as may be utilized in forming the carrier materials can encompass any natural or synthetic non-toxic and biodegradable polymer that can function in the waste treatment environment expected in the process. For instance, the biodegradable polymer can have a glass transition temperature greater than the expected temperature of the fluid waste stream. As utilized herein, the term "biodegradable" generally refers to a material that will degrade over time to form non-toxic break-down products by the action of enzymes, by hydrolytic action and/or by other mechanisms of biological materials or systems. As utilized herein, the term "non-toxic" generally refers to a material that is not injurious to health of plants, organisms, animals, and/or humans that is held in sustained contact with the material.

The polymeric carrier materials can include homopolymers and/or copolymers and can encompass multi-component materials. For example, block copolymers in which the blocks vary according to some characteristic (e.g., hydrophobic/hydrophilic, charge characteristics, etc.) can be utilized that can self-organize to present a higher proportion of one of the components on the surface of the carrier material for contact with a waste stream and the targeted contaminant(s) therein. For example, a copolymer including a biodegradable hydrophobic component (e.g., poly(lactic acid)), and a hydrophilic component, such as polyethylene glycol, can be utilized that can self-organize to present the polyethylene glycol at the surface of the carrier material, which can then be functionalized as described further herein.

Multi-component materials can include two or more different materials that are combined together to form a single structure as an intimate blend or in separate areas of the structure (e.g., a core/shell particle or fiber). The different materials can be organized so as to present a single material at a contacting surface of the carrier material or so as to present different materials in different zones of the carrier material. For example, a multi-component fiber in the form of a core/shell fiber can present one material at the fiber surface for contact with the waste stream and can include a second material as an inner core of the fiber. In an alternative arrangement, a first material can form a first outer surface of the formation and a second material can form a second outer surface of the formation, such that both materials may contact the waste stream and the targeted contaminant(s) therein and can do so in different zones of the total contact area.

Exemplary non-toxic and biodegradable polymers for use in forming the carrier material can include, without limitation, collagen; alginates and alginate derivatives; polysaccharides; polyethylene glycol (PEG); poly(glycolic acid) (PGA); poly(lactic acid) (PLA) including D-lactide; D,L-lactide or L-lactide; poly(lactide-co-glycolide) (PLGA); gelatin; agarose; natural and synthetic polysaccharides; polyamino acids such as polypeptides including poly(lysine); polyesters such as polyhydroxybutyrate and poly-ε-caprolactone; polyanhydrides; polyphosphazines; poly(vinyl alcohol) (PVA); PVA-ε-PLGA; poly(alkylene oxides) such as poly(ethylene oxides) (PEO); poly(allylamines) (PAM); acrylamides such as poly(acrylic acid) (PAA) and poly(acrylonitrile-acrylic acid); modified styrene polymers such as poly(4-aminomethylstyrene); pluronic polyols (e.g., PEO-PPO-PEO); polyoxamers, poly(uronic acids); poly(vinylpyrrolidone); poly(α-hydroxy acids) and conjugates thereof; polyorthoesters; polyaspirins; polyphosphagenes; starch including pre-gelatinized starch; hyaluronic acid; chitosans; albumin; fibrin; vitamin E analogs such as α-tocopheryl acetate; d-α-tocopheryl succinate; caprolactone; dextrans; vinylpyrrolidone; methacrylates; poly(N-isopropylacrylamide); PEGT-PBT copolymers; PEO-PPO-PAA copolymers; PLGA-PEO-PLGA copolymers; PEG-PLG copolymers; PLA-PLGA copolymers; poloxamers; PEG-PLGA-PEG triblock copolymers; SAIB (sucrose acetate isobutyrate); PLA-PEG copolymers; hyaluronic acid; or combinations thereof.

The polymeric materials can include other additives as are known in the art in addition to the non-toxic, biodegradable polymers according to standard practice and including, without limitation, processing aids, nucleation agents, colorants, lubricants, strength additives (e.g., fibrous additives), thermal protectant materials, and so forth. Additives can generally be combined with the polymers in standard amounts and can be non-toxic such that the final polymeric carrier material and degradation products of the carrier material are also non-toxic.

The polymers and/or other additives used in the formation of the carrier materials can be processed as necessary to provide a desired stability of the carrier materials both before and after sequestration or reaction with the targeted contaminant. For instance, when employed in an industrial setting for capturing VOCs, a robust and stable material that will begin to biodegrade only after the carrier material is fully spent and slated for disposal (or regeneration) can be preferred. Conversely, in an embodiment in which the carrier material is to be employed in a rapid-dispense emergency situation (e.g., to counteract the environmental release of a chemical warfare agent or pesticide), a carrier material that rapidly neutralizes the targeted contaminant through reaction and then quickly biodegrades on-site into innocuous by-products may be preferred.

The degradation profile of the carrier materials can be tuned within a desired time frame ranging between, for example, a few minutes to several years. In general, the desired degradation profile of the material will depend heavily upon its desired end-use, expected pre-use shelf life, post-use processing and disposal of sequestered materials, and the like. Methods for controlling the degradation profile of the carrier materials can include, for instance, selection of polymer formulation, formation and density of crosslinks in the polymer(s), combination and organization of different materials, and so forth.

The carrier materials can be formed to any desired shape and size according to standard methods as are known in the art. For instance, carrier materials can be formed as continuous or chopped fibers according to melt extrusion methods (e.g., melt spinning, melt blowing, etc.) as are generally known. Sheets or films formed of the carrier materials can be formed according to solution or melt casting processes, extrusion processes, and so In one embodiment, the carrier materials can be in the form of nano- or micro-sized particles. Particles of the carrier materials can be formed according to standard practice. For instance, an emulsification solvent evaporation method or an emulsification solvent diffusion method can be utilized to form micro- or nanoparticles of the carrier material. Briefly, one embodiment of a particle formation process can include a first step of emulsification in which the biodegradable polymer is dissolved in a solvent (e.g., an organic solvent), and then the emulsion is formed by adding this phase (e.g., an organic phase) to a second phase (e.g., an aqueous phase) and stirring. Following, the solvent can be removed from the emulsion by evaporation or dialysis. Finally, the nanoparticles can be obtained after freeze dehydration.

The variability of the carrier materials with regard to both composition and form provides a route to the development of a system that can be specifically designed for a particular waste treatment process. The stability, polymer characteristics, break-down products and physical form of the carrier material can be altered to best suit the application of the materials. This can be of great benefit in designing a waste treatment process and system that can optimize the capabilities of the carrier materials and functional groups and efficiently target one or more contaminants in a waste stream.

The carrier materials carry one or more functional groups that can be pre-determined for a particular application of the materials. For instance, and depending upon not only the targeted contaminant(s) of a fluid but also on the overall characteristics of the fluid (e.g., flowing or static, volume, temperature, state, pressure, etc.) and the final disposal or recovery of the targeted contaminants, the functional groups can be predetermined and applied to the carrier material in accord with the desired function.

The functional groups carried by the carrier materials can be specifically targeted to a single material of a fluid or can be targeted to a plurality of different contaminants in a fluid. For instance, rendering emissions are a well-characterized yet complex mixture of a variety of chemicals, with about 110 distinct volatiles that have been detected and identified, and with 26 of those confirmed to contribute to the unsavory odors of cooking processes. Many of these volatiles are highly flammable, corrosive, carcinogenic, and/or toxic to both humans and animals, and as such, present potential targeted materials for a waste treatment system as disclosed herein.

FIG. 3 presents a summary of the 26 offending odorants found in rendering emissions, as well as a general depiction of their common functional group. The list contains ten aliphatic aldehydes ranging from three to ten carbons in length. Carboxylic acids comprise the second most populous group, containing examples ranging from two to six carbons in length. Sulfur containing functional groups (including thiols, sulfides, disulfides, and trisulfides) comprise the third largest group of offending odorants. Additionally, a single alcohol and a single amine have been identified. Most of these volatile organics result from the thermal breakdown of protein and fats during the cooking process. This well-defined, yet still complex mixture of a variety of distinct chemical entities presenting a number of distinct chemical functional groups is one example of contaminants in a waste stream that can be treated according to the disclosed methods and system for the remediation of VOC environmental contaminants.

Of course, the above is just one example of mixtures of contaminants that can be treated by use of the disclosed methods and systems. Contaminants that can be targeted by the methods can have any structure and be by-products or waste from any industry or environment. For example, contaminants can be simply malodorous, can be malodourous as well as toxic, can be toxic but not malodorous, or can be undesirable due to some other characteristic or combination of characteristics. For instance, small, highly volatile compounds such as propanal (an aldehyde) and/or propionic acid (a carboxylic acid) can be targeted, as can branched compounds such as the aldehyde 2-methylbutanal and/or the carboxylic acid isovaleric acid. Contaminants can include, for example and without limitation, halogenated contaminants (e.g., dichloroethane); acids (e.g., acetic acid); organic solvents (e.g., acetone); agricultural contaminants (e.g., ammonia); aromatic contaminants (e.g., benzene); etc. Carrier materials including functional groups can be engineered to target chemical entities of interest including pharmaceuticals, components of personal care products, perchlorates, endocrine-disrupting compounds, and so forth. In one embodiment, contaminants encountered in day to day living can be targeted. For instance, malodourous or otherwise undesirable contaminants in home or work environments, such as cigarette smoke contaminants, kitchen malodors, and the like can be targeted.

Multiple contaminants having the same or different targeted functional groups that are present in a single fluid can be sequestered and/or modified according to disclosed processes either sequentially or simultaneously. For instance, methods and systems can be designed to target a mixture of aldehyde and carboxylic acid VOC contaminants in a single gaseous waste stream with a single sequestering/modification step targeting multiple aldehydes (e.g., targeting both hexanal and 2-methylbutanal) in a single step, multiple carboxylic acids (e.g., targeting both hexanoic acid and isovaleric acid) in a single step, or both aldehydes and carboxylic acids (e.g., hexanal and hexanoic acid) in a single step. In one embodiment, all of the targeted contaminants of a waste stream can be simultaneously removed and/or modified in a single treatment step.

Beneficially, the carrier materials can be designed to specifically target contaminants in a fluid while not being fouled by other materials that may also be in the fluid in conjunction with the contaminants. For instance, gaseous emission streams can often include materials such as carbon dioxide in levels acceptable for release (e.g., atmospheric levels). Disclosed carrier materials can target the desired contaminants in the presence of other compounds such as carbon dioxide without being fouled due to interaction of the functional groups of the carrier materials with the other, non-targeted fluid components.

Of course, disclosed methods and systems are not limited to either the malodorous contaminants of a rendering process emission or to VOCs. Other contaminants in liquid, vapor, or gaseous state can be targeted according to disclosed methods. For instance, in one embodiment, a fluid containing one or more organophosphorous (OP) compounds including, without limitation, chemical warfare agent mimics, pesticides and flame retardants, can be treated according to disclosed methods. By way of example, disclosed methods can be utilized to remediate a fluid (e.g., liquid, gaseous, or vaporous) containing one or more organophosphorous chemical warfare agents such as tabun, sarin, or VX; organophosphorous pesticides such as atrazine, aldicarb, alachlor, chlorpyrifos, diazinon, and malathion; and/or organophosphorous flame retardants such as TPP, CDPP, and EHDP.

The functional group of the carrier materials can be bonded either directly or indirectly to the biodegradable carrier material and can target one or more contaminants of the fluid. For instance, in one embodiment, the functional group can be directly bonded to the back-bone of a non-toxic biodegradable polymer of the carrier material. In another embodiment, the functional group can be bonded to a biodegradable polymer via a linker region such as an aliphatic, cyclic, and/or aromatic linker region. When considering copolymers, the functional group can be bonded to the copolymer via any suitable segment of the copolymer. For instance, the functional group can be directly or indirectly bonded via a linker group to the outer PEG shell of a self-organizing PEG copolymer structure. The density of the functional groups contained in the carrier materials can vary as desired, with any preferred amount depending upon the nature of the carrier material as well as the quantity and type of contaminant to be treated by the methods. For instance the carrier material can include the functional group in an amount of about 0.1 mg or greater of functional group per 100 mg of carrier material (e.g., a particle comprising the carrier material), about 1 mg or greater of functional group per 100 mg of carrier material, about 10 mg or greater of functional group per 100 mg of carrier material, about 20 mg or greater of functional group per 100 mg of carrier material, about 40 mg or greater of functional group per 100 mg of carrier material, or about 50 mg or greater of functional group per 100 mg of carrier material.

Functional groups can include any material that can target one or more contaminants in a fluid for either sequestration or modification. As such, the preferred functional group(s) in any particular application can depend upon the nature of the carrier material as well as upon the nature of the targeted contaminant(s). Functionality as may be incorporated on the carrier material can include, without limitation, one or more of carboxyl; hydroxyl; amino (primary, secondary, tertiary); amine N-oxides (primary, secondary and tertiary); carbonyl; phosphate; sulfate (e.g., sulfo, sulfonyl, thiol); oxime; halide; aldehyde; ammonium; cyano; imino; nitro; peroxy; pyridyl; etc. Functionality can be present in a monovalent or multivalent format and can be presented in a monomeric or polymeric form, or a combination thereof. For instance, linear or branched polymers or copolymers carrying one or more functional groups that can be the same or different from one another can be bonded to a carrier material, optionally in conjunction with a linker group. In addition, multiple different functional groups can be carried by a carrier material in the same or different formats.

Functional groups can be components of or derived from synthetic or natural materials. For instance, functional groups can be derived from natural lipid, protein, nucleic acid, or carbohydrate materials and can exhibit desired reactivity toward the targeted compounds. Alternatively, synthetic compounds can be utilized to provide the desired functionality to the carrier materials. Of course, combinations of naturally derived and synthetic materials can be utilized to provide a carrier material with multiple different functional groups and/or formats for targeting one or multiple targets in a fluid.

Any suitable chemistry can be utilized to bind the desired functionality to the carrier material. For instance, a carrier material can be formed to include suitable reactive functionality for interaction with the functional groups of choice or can be activated following formation and at the time of functionalization. For instance, a polymer of the carrier material can be activated by use of carbodiimide chemistry as is known in the art. Following activation, the desired functional groups can be reacted with the activated sites of the carrier material and thereby bonded to the carrier material.

Amine functionality can be utilized to bind one or more contaminants, e.g., aldehydes and/or carboxylic acid contaminants of a fluid. Methods for amine-functionalizing the carrier material can, of course, vary depending upon the specific polymer(s) of the carrier material. In one embodiment, carboxylic groups on a carrier material surface can be activated with a carbodiimide (e.g., 1-Ethyl-3-(3-dimethylaminopropyl)carbodiimide hydrochloride (EDC)), and the activated ester groups of the carrier material can then react with a primary amine of a compound containing the desired functionality to form an amide bond and bond the functional group-containing polymer to the carrier material. In one embodiment, the activated carrier material can be reacted with a relatively low molecular weight amine-containing polymer such as polyethyleneimine (LMWPEI). LMWPEI is a dendritic polyamine that can present a number of primary, secondary and tertiary amines on the surface of the carrier material.

Figure 5A:
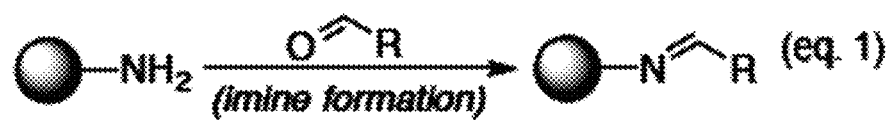
FIG. 5A illustrates the reaction of an amine functionalized carrier material with an aldehyde contaminant.
Figure 5B:
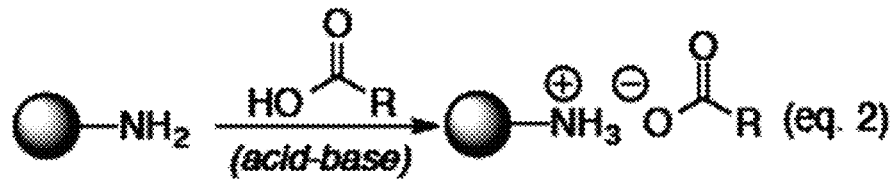
FIG. 5B illustrates the reaction of an amine functionalized carrier material with a carboxylic acid contaminant.

FIG. 4 schematically illustrates one embodiment of a carrier material (PLA-PEG) following functionalization with an amine functional group via end capping with PEI. FIG. 5A illustrates the expected reactivity of an amine functionalized carrier material with an aldehyde-containing contaminant via imine formation, and FIG. 5B illustrates the expected reactivity of an amine functionalized carrier material with a carboxylic acid-containing contaminant via acid-base reaction.

While amine functionalized carrier materials can be utilized to sequester a large variety of contaminants including aldehyde, sulfur, and carboxylic acid contaminants, amine functionality may prove less effective in neutralizing certain particular contaminants. For instance, the five sulfur-containing compounds associated with rendering operations are particularly noxious, emitting an overwhelming, putrid odor that is detectable even at miniscule concentrations, and certain functionalities may be preferable over others in targeting such specific contaminants. In one embodiment, the carrier material can carry a peroxysulfate functional group capable of oxidatively neutralizing certain contaminants, such as sulfur-containing contaminants via, e.g., reaction with a quaternary ammonium peroxysulfate. An ammonium peroxysulfate decorated carrier material (a schematic illustration of which is provided in FIG. 6) can oxidize the sulfurous VOCs to less odorous, less-reactive by-products as illustrated as the conversion of methanethiol to methyl sulfonic acid illustrated in FIG. 7.

Figure 6:
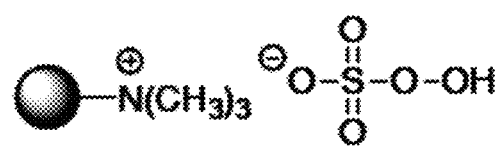
FIG. 6 illustrates a carrier material including an ammonium peroxysulfate functional group.
Figure 7:
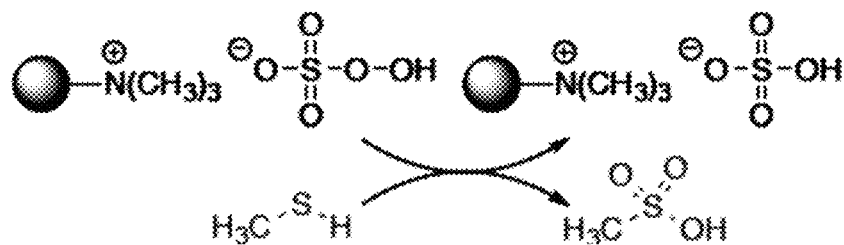
FIG. 7 illustrates the oxidation of a sulfurous contaminant to a less noxious compound according to one embodiment of the disclosed methods.

One exemplary method for modifying a carrier material to carry a peroxysulfate functional group can encompass a first step in which a polymer of the carrier material is activated (for instance, by use of carbodiimide chemistry), followed by reaction with an appropriate linker that displays a quaternary ammonium chloride salt. Following, the polymer can be further processed to form the quaternary ammonium peroxysulfate-functionalized carrier material via counteranion exchange. By way of example, potassium peroxysulfate (i.e., $KHSO_5$), the active oxidant of commercial Oxone®, can be isolated, and the carrier material including quaternary ammonium chloride salt functionality can be treated with an aqueous solution of potassium peroxysulfate (i.e., $KHSO_5$) in order to exchange the chloride anion on the surface of the carrier material with the desired peroxysulfate anion (FIG. 6).

In another embodiment, a PEI-based functionality, such as the LMWPEI material described above, can be subjected to bleach oxidation to generate an amine N-oxide decorated material that is suitable for the oxidative degradation of sulfurous contaminants.

Oxime functional groups can be applied to a carrier material that are capable of remediating a broad class of organophosphorous (OP) chemicals including chemical warfare agent mimics, pesticides, and flame retardants in both aqueous and gas phase. Reaction between the oxime functionality and an OP chemical results in chemical transformation and a loss of deleterious biological function of the OP compound. Thus, incorporating this functional group onto the surface of a carrier material can result in the development of a robust platform capable of neutralizing these materials in the environment via chemical conversion to less harmful substances.

Figure 8:
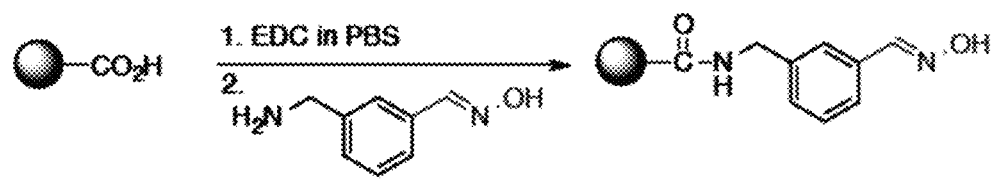
FIG. 8 illustrates one method for forming an oxime functionalized carrier material.

Oxime functionalized carrier materials can be formed by capping a polymer of the carrier material with an aminooxime polymer via, e.g., the protocol described above for other functional groups. One exemplary method is illustrated in FIG. 8.

Figure 9:
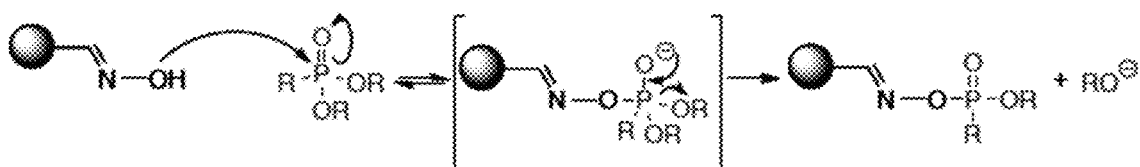
FIG. 9 illustrates the oxidation of an organophosphorous contaminant according to one embodiment of the disclosed methods.

An oxime functional group of a carrier material can neutralize OP contaminants according to a nucleophilic substitution at the phosphorus (V) center (FIG. 9) that results in the sequestration of the material along with the deactivation of the OP to ameliorate its biological effect. Briefly, the oxime hydroxyl group attacks the electrophilic phosphonyl (i.e., P=O) of the OP contaminant, generating the intermediate in brackets in FIG. 9. Collapse of that intermediate with displacement of one of the alkoxy substituents results in the covalent harness of the OP contaminant onto the surface of the oxime functionalized carrier material with concomitant loss of biological effect.

A carrier material can be functionalized with multiple different functional groups so as to target multiple different contaminants present in a single fluid. For instance, a carrier material can be functionalized so as to carry both amine functional groups and ammonium peroxysulfate or amine N-oxide functional groups. This hybrid carrier material can thus be adequately equipped to capture aldehyde and carboxylic acid contaminants, as well as to oxidize sulfur-containing agents. By such mechanisms, the carrier materials can exhibit great variability, as well as tunability to target a wide range of contaminants present in fluids such as waste streams.

Figure 10:
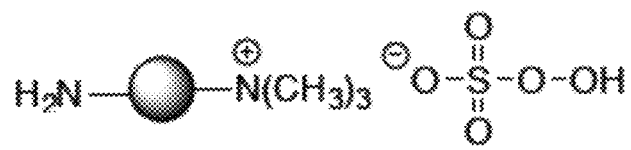
FIG. 10 illustrates one embodiment of a bifunctional carrier material.

One exemplary process for forming a carrier material that includes multiple different functional groups can be initiated by activating the carrier material, as described previously. After formation of the activated ester (e.g., after EDC treatment), the material can be capped with a statistical mixture of two or more unique functional groups by simply controlling the ratio of the incoming capping groups during the fabrication process. For example, by simultaneously capping the carrier material with a mixture of the appropriate amine and quaternary ammonium salts, a hybrid functionalized carrier material can be prepared in one operation. Subsequent treatment of the quaternary ammonium sites with potassium peroxysulfate as described above can then produce hybrid functionalized carrier material equipped with both amines and ammonium peroxysulfates (FIG. 10) that can target multiple different contaminants in a mixture that contains, for example, hexanal, hexanoic acid, and dimethyl sulfide.

The functional groups encompassed in the disclosed methods, materials, and systems can be selected so as to interact with a targeted compound in any suitable fashion. For instance, a functional group can bond with a targeted compound for sequestration and removal and the bond formation can be covalent, ionic, electrostatic, hydrophilic/hydrophobic, and so forth. Low affinity/high avidity interactions, as well as high affinity/low avidity interaction, between a targeted compound and a functional group are also encompassed herein. Upon bonding, the functional group can (though not necessarily) degrade and/or deactivate the targeted compound so as to render the targeted compound safe for disposal. In another embodiment, the functional group can interact with the targeted compound through deactivation and/or degradation of the compound without bonding between the two. For instance, the functional group can react directly with the targeted compound, e.g., in an oxidation/reduction reaction, so as to render the targeted compound less noxious and/or less harmful. Alternatively, the functional group can catalyze a reaction between the targeted compound and some other component of the waste (e.g., a reactant that can be added to the waste) so as to render the compound safe to remain in the fluid.

Through interaction between the functional groups and the targeted compound, about 75% or more of the targeted compound, for instance about 80% or more, about 85% or more, about 90% or more, about 95% or more, or about 98% or more in some embodiments, can be removed from a fluid and/or modified. Thus, the disclosed methods and systems can be highly efficient in remediating a fluid.

A system for use in carrying out the disclosed methods can include a system designed for use in an industrial application in which the carrier materials can be incorporated into a unit operation of a processing plant or a waste treatment system. For instance, a scrubber, filtration system, bag house, etc. for gaseous emissions and/or liquid or solid waste from an industrial operation can incorporate the carrier materials in a suitable format (e.g., a filtration cartridge, a packed bed reactor, etc.) so as to contact the fluid stream and remove and/or modify the targeted contaminants.

Systems for utilization of the disclosed materials can also encompass non-industrial applications. For instance, protective and clean-up systems are encompassed in which the functionalized carrier materials can be provided so as to allow for contact with targeted contaminant(s) in a chemical spill or chemical attack scenario. For example, a liquid, solid, aerosol, or the like that incorporates the functionalized carrier materials can be utilized to clean up an area that has been contaminated with the targeted contaminants and/or to protect an area or individual from contamination with the targeted contaminants. A liquid or aerosol can be applied to a surface or to a targeted space through spraying, liquid application, or the like, and thus be capable of contact with the targeted materials. In one embodiment, the carrier materials can be incorporated in a fibrous cleaning wipe, e.g., a cloth or cellulose-based paper wipe that can absorb a liquid, upon which targeted materials in the liquid can interact with the functional groups of the carrier material.

The carrier materials can be incorporated in textiles including, without limitation, upholstery, drapes, rugs, etc., as well as in clothing (e.g., face masks, protective suiting, etc.) to protect and decontaminate an area from targeted contaminants and to prevent contact between an individual and targeted contaminants. The carrier materials can be applied as a coating, for instance, on a fiber or on a formed textile and can serve as a protective coating in the event of contact between the material and the targeted contaminants. By way of example, textiles including woven, knitted, and non-woven fibrous goods, e.g., face masks, clothing, upholstery, etc. can include the carrier materials on the surface and/or within the bulk of the goods (e.g., in the fibers themselves or in form of micro- or nano-sized particles applied to or within the fibers). The functionalized carrier materials can thus serve as a protectant in the event of contact with the targeted compounds (e.g., dangerous chemical agents).

Methods of applying the carrier materials to a structure can include, for example, application of a suspension containing the carrier materials in a particulate form to the structure and subsequent drying (optionally, in conjunction with heating or other energy application) of the structure to remove the liquid carrier of the suspension. The particles of the carrier material can be retained on the structure (e.g., a solid surface, a fiber or formed textile surface) through charge/charge interaction, non-covalent bonding, covalent bonding, etc. For instance, a portion of the functional groups added to the carrier material as described above can be utilized to bond the carrier material to the structure, while a second portion of the functional groups can be retained on the carrier material for interaction with a targeted contaminant.

Figure 11:
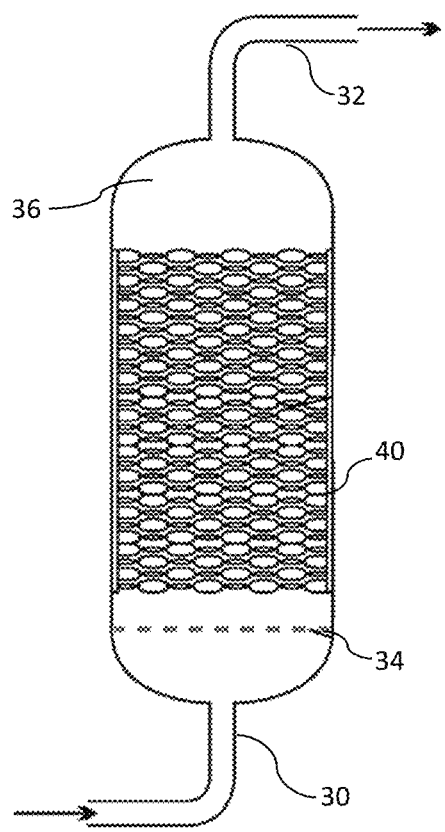
FIG. 11 illustrates a packed bed treatment system.

One system encompassed herein can provide the functionalized carrier materials in a packed bed column, such as illustrated in FIG. 11. The treatment system can include a flow path for the fluid stream including an inlet 30 to the column 36 and an outlet 32 from the column 36. A fluid, e.g., a gas, vapor, or liquid fluid, can be directed through the column 36 so as to contact the bed materials 40 contained within the column 36. The bed materials 40 can include the functionalized carrier materials that, upon contact with the fluid can sequester and/or modify the targeted contaminants. A column can include standard features, such as diffusers 34, as are known in the art to improve flow and contact between the fluid and the bed materials.

Figure 12:
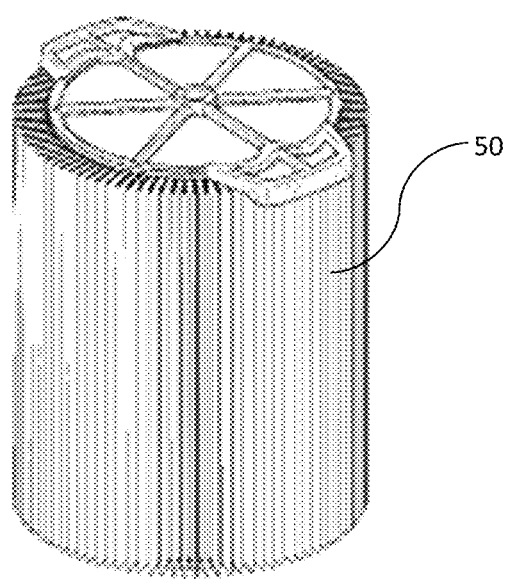
FIG. 12 illustrates a filter cartridge as may be incorporated in a treatment system.

According to another system, the carrier materials can be included in a filter or filter cartridge, one embodiment of which is illustrated in FIG. 12. A filter 50 can include the carrier materials, for instance in the form of fibers utilized in forming a fibrous filter 50. A fibrous filter 50 can include fibers in a woven or nonwoven mat, as is known. In addition, a filter can include particulates adhered to or otherwise captured within the fibers of the filter. In such an embodiment, the functionalized carrier materials can be in the form of particulates (e.g., nanoparticles and/or microparticles) contained in and/or on a fibrous filter 50. In addition, though illustrated as a circular filter cartridge 50, it should be understood that a filter can be in any suitable shape for location in a flow path and contact between the functionalized carrier materials and the targeted contaminants.

In addition, and depending upon the treatment system that incorporates the functionalized carrier materials, the carrier materials may be combined with other materials in forming a treatment system component. For instance, fibrous carrier materials can be combined with other fiber types in formation of a fibrous filter cartridge, protective clothing, face mask, etc. Similarly, a packed bed column can include additional materials (e.g., other types of particles) in combination with the carrier materials.

The present disclosure may be better understood with reference to the examples, set forth below.

Example 1

Low molecular weight polyethylene imine capped PLA-PEG nanoparticles were generated by dissolving PLA-PEG-COOH polymer (generated by ring opening polymerization) in acetonitrile (~5 mg/m L). This acetonitrile solution was then added dropwise into water to allow for the polymeric nanoparticles to form over the course of about 1.5 hours. The individual polymer strands self-assemble into nanoparticles by hydrophobic-hydrophobic interactions between the PLA polymer chain such that the hydrophilic PEG outer layer was projected into the aqueous solvent. After the 1.5-hour incubation, the nanoparticles were washed by ultracentrifuge filtration to remove residual solvents.

The nanoparticles were then re-suspended in phosphate buffered saline (PBS) (pH 7.4) and then incubated in a 10× molar excess of 1-ethyl-3-[3-dimethylaminopropyl] carbodiimide (EDC) in PBS (pH 7.4) to generate the activated ester. The amine cap (i.e., LMWPEI) was then added as a 10× excess to the activated ester-containing nanoparticles and incubated for six hours in order to load the amine cap via amide formation. The amine-capped PLA-PEG nanoparticles were then washed three times with distilled water using ultracentrifugation and dried using a freeze dryer.

After preparation, the nanoparticles were characterized by 1H nuclear magnetic resonance (NMR) spectroscopy, infrared (IR) spectroscopy, and thermogravimetric analysis (TGA). The presence of the amine functionality on the surface of the NPs was further verified by zeta potential measurements. Nanoparticle size was judged by zetasizer measurements to be about 100 nanometers.

Example 2

Figure 13:
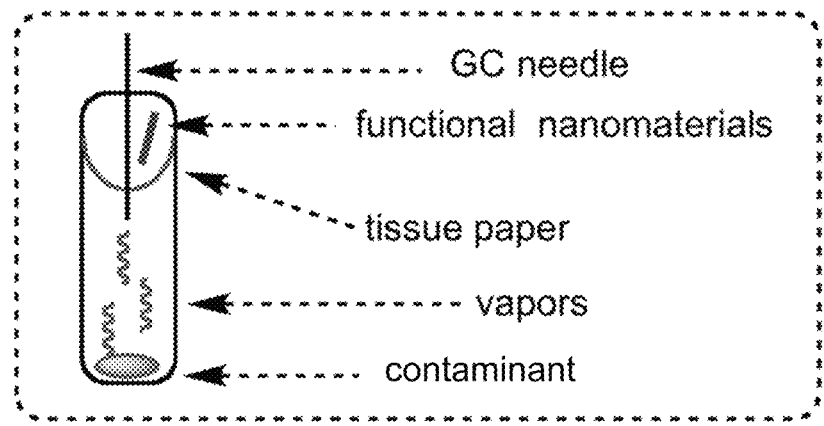
FIG. 13 illustrates a testing system utilized to examine methods and systems as described herein.

The PLA-PEG-LMWPEI nanoparticles described above were utilized to capture gaseous samples of target VOCs associated with rendering operations. Briefly, 10 mg of a freshly prepared sample of PLA-PEG-LMWPEI nanoparticles was suspended on a tissue paper barrier above a 1 µL aliquot of analyte in a GC vial (FIG. 13). Thus, the nanoparticles were allowed to interact with the vapor portion of the analyte sample for 30 minutes. Headspace analysis was conducted by gas chromatography (FID detection). Analyte samples were treated with PLA-PEG-LMWPEI nanoparticles minutes and untreated tissue paper was utilized as control. Samples were treated for 30 minutes. Single analytes, as well as mixtures of two different analytes, were examined. Untreated control samples demonstrated no reduction in gas-phase analyte concentration. The table below provides results for several different analytes (data collected in sextuplicate).

| Analyte | Percent reduction |
| --- | --- |
| Hexanal | 97 ± 2 |
| Hexanoic acid | 86 ± 6 |
| Butyraldehyde | 86 ± 4 |
| Butyric acid | 86 ± 6 |
| 2-methylbutanal | 81 ± 4 |
| 3-methylbutanoic acid | 76 ± 6 |
| Octanal | 77 ± 12 |
| Nonene | 14 ± 2 |
| Hexanal/Hexanoic Acid | 90 ± 7/69 ± 6 |
| Hexanal/Octanal | 87 ± 6/52 ± 18 |
| Hexanal/Nonene | 63 ± 35/46 ± 29 |
| Hexanoic Acid/Nonene | 71 ± 3/10 ± 2 |

Figure 14:
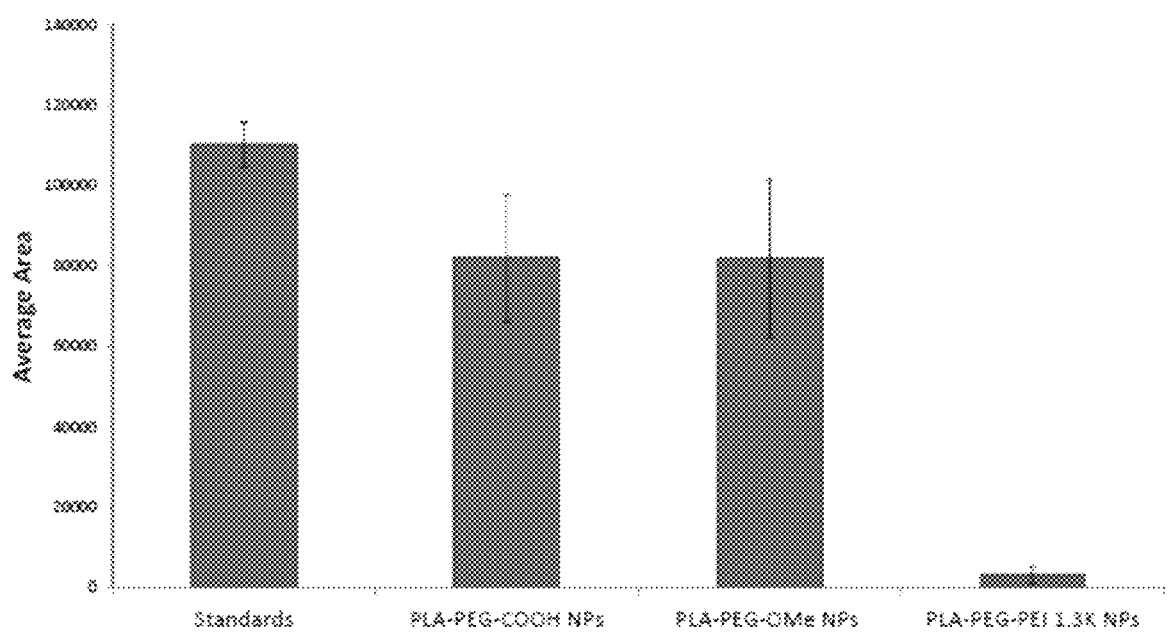
FIG. 14 graphically compares the ability of three different functionalized carrier materials to target a VOC contaminant in a sample.

Three different nanoparticles were examined for hexanal reduction. Notably, the reduction in hexanal concentration was only observed with the amine-functionalized nanoparticles (FIG. 14). "Average Area" on FIG. 14 refers to the average peak area under the curve for an analyte chromatogram peak over six sequential runs. The percent reduction of target analyte was determined by calculating the reduction in peak area relative to calibrated, untreated control samples. Treatment of hexanal with nanoparticles end-capped with carboxylic acids (—COOH) or methyl esters (—COOCH$_3$) did not appreciably reduce the concentration of hexanal (FIG. 14) underscoring the necessity of a functional group cap with compatible reactivity, and further demonstrating the unique target-specific selectivity of the disclosed method. These data also indicate that the amine-capped nanoparticles likely capture hexanal via covalent reaction in lieu of non-specific electrostatic adsorption. These results clearly indicate that the PLA-PEG-LMWPEI nanoparticles are equipped with appropriate functionality to capture aldehyde VOC pollutants associated with rendering emissions.

Example 3

The potential toxicity of the nanoparticle formulations was examined. As an initial evaluation, the base nanoparticle formulation (PEG-PLA-COOH) was examined for acute toxicity in a Daphnid (water flea) aquatic invertebrate model. Briefly, the nanoparticles were tested for toxicity using a standard *Daphnia magna* acute toxicity test, according to US-EPA protocol. The nanoparticles were tested at 7 concentrations ranging from 1 to 5000 ppm, plus appropriate controls without nanoparticles. The test organisms were cultured in standard *D. magna* culture media and fed a mixture of *Selenastrum capricornutum* and fish food on a daily basis. Daphnid cultures and test beakers were maintained in a climate-controlled room at 20° C. and 16/8-hour light/dark cycles. On the day of the toxicity test, neonate daphnids (less than 24 hours of age) were collected from the culture and introduced into the test beakers. Each beaker contained 40 mL of media with the nanoparticles dissolved, and 5 neonates per beaker. Each nanoparticle concentration was tested in 4 replicate beakers. Neonates were exposed for 48 hours and were not fed during the exposure. After the exposure period, test animals were checked for mortality. The results showed no significant mortality in any of the tested nanoparticle concentrations.

It will be appreciated that the foregoing examples, given for purposes of illustration, are not to be construed as limiting the scope of this disclosure. Although only a few exemplary embodiments of the disclosed subject matter have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A method for remediating a fluid comprising spraying an aerosol in an area containing the fluid, the aerosol carrying a particle comprising a biodegradable polymer, the particle further comprising a second polymer bonded to a surface of the particle, the second polymer comprising a plurality of amine groups, the fluid comprising a malodorous volatile organic compound (VOC) by-product, wherein upon the spraying, the particle contacts the fluid, and the amine groups of the second polymer react with a functionality of the malodorous VOC by-product to sequester and/or to modify the malodorous VOC by-product.

2. The method of claim 1, wherein the fluid comprises a gas, a vapor, a liquid, or a combination thereof.

3. The method of claim 1, wherein the malodorous VOC by-product is a by-product of a rendering operation.

4. The method of claim 1, the functionality of the malodorous VOC by-product comprising an aldehyde and/or a carboxylic acid and/or a sulfur-containing functionality.

5. The method of claim 4, the malodorous VOC by-product comprising one or more of propanal, butanal, 2-methylpropanal, 2-methylbutanal, 3-methylbutanal, pentanal, hexanal, heptanal, oxtanal, nonanal, decanal, acetic acid, propionic acid, isobutyric acid, butyric acid, isovaleric acid, valeric acid, isocaproic acid, caproic acid, methanethiol, dimethylsulfide, dimethyl disulfide, dimethyl trisulfide, and methylpropyl sulfide.

6. The method of claim 1, wherein the fluid comprises a plurality of malodorous VOC by-products, wherein upon the contact, the amine groups of the second polymer react with the functionality of multiple malodorous VOC by-products of the plurality.

7. The method of claim 1, wherein upon the contact, about 75% or more of the malodorous VOC by-product contained in the fluid is sequestered and/or modified.

8. The method of claim 1, wherein the biodegradable polymer comprises a polysaccharide.

9. A method for remediating a fluid comprising contacting a fluid with a nano-sized particle comprising a polysaccharide homopolymer, the particle further comprising a second polymer bonded to a surface of the particle, the second polymer comprising a plurality of amine groups, the fluid comprising a plurality of malodorous volatile organic compound (VOC) by-products of a rendering process, wherein upon the contact, the amine groups of the second polymer react with a first functionality of the plurality of malodorous VOC by-products of the rendering process to sequester and/or modify at least a portion of the plurality of malodorous VOC by-products;
wherein the step of contacting comprises spraying an aerosol carrying the nano-sized particle in an area containing the fluid, or comprises contacting the fluid with a suspension carrying the nano-sized particle.

10. The method of claim 9, wherein the second polymer comprises polyethyleneimine.

11. The method of claim 9, wherein the first functionality of the plurality of malodorous VOC by-products comprises an aldehyde and/or a carboxylic acid and/or a sulfur-containing functionality.

12. The method of claim 11, the plurality of malodorous VOC by-products comprising two or more of propanal, butanal, 2-methylpropanal, 2-methylbutanal, 3-methylbutanal, pentanal, hexanal, heptanal, oxtanal, nonanal, decanal, acetic acid, propionic acid, isobutyric acid, butyric acid, isovaleric acid, valeric acid, isocaproic acid, caproic acid, methanethiol, dimethylsulfide, dimethyl disulfide, dimethyl trisulfide, and methylpropyl sulfide.

13. The method of claim 9, wherein the particle further comprises a second functionality that differs from the amine groups of the second polymer, and wherein upon the contact, the second functionality of the particle reacts with a third functionality of the plurality of malodorous VOC by-products, the third functionality of the plurality of malodorous VOC by-products differing from the first functionality of the plurality of malodorous VOC by-products.

14. The method of claim 13, the second functionality of the particle comprising ammonium peroxysulfate or amine N-oxide functionality.

15. The method of claim 9, the method sequestering and/or modifying about 75% or more of the plurality of malodorous VOC by-products of the fluid.

16. The method of claim 9, the method sequestering and/or modifying about 85% or more of the plurality of malodorous VOC by-products of the fluid.

17. The method of claim 13, wherein the first functionality of the plurality of malodorous VOC by-products of the rendering process or the third functionality of the plurality of malodorous VOC by-products of the rendering process comprises a functionality of a pharmaceutical contained in the fluid.

18. The method of claim 3, wherein the fluid comprises a breakdown product of an animal fat.

19. The method of claim 18, wherein the amine groups or a second functional group of the particle is configured to target a pharmaceutical contained in the fluid.

20. A method for remediating a fluid comprising contacting the fluid with a suspension, the suspension carrying a particle comprising a biodegradable polymer, the particle further comprising a second polymer bonded to a surface of the particle, the second polymer comprising a plurality of amine groups, the fluid comprising a malodorous volatile organic compound (VOC) by-product, wherein upon the contact, the amine groups of the second polymer react with a functionality of the malodorous VOC by-product to sequester and/or to modify the malodorous VOC by-product.

21. The method of claim 20, wherein the fluid comprises a gas, a vapor, a liquid, or a combination thereof.

22. The method of claim 20, wherein the malodorous VOC by-product is a by-product of a rendering operation.

23. The method of claim 22, wherein the fluid comprises a breakdown product of an animal fat.

24. The method of claim 23, wherein the amine groups or a second functional group of the particle is configured to target a pharmaceutical contained in the fluid.

25. The method of claim 20, the functionality of the malodorous VOC by-product comprising an aldehyde and/or a carboxylic acid and/or a sulfur-containing functionality.

26. The method of claim 20, the malodorous VOC by-product comprising one or more of propanal, butanal, 2-methylpropanal, 2-methylbutanal, 3-methylbutanal, pentanal, hexanal, heptanal, oxtanal, nonanal, decanal, acetic acid, propionic acid, isobutyric acid, butyric acid, isovaleric acid, valeric acid, isocaproic acid, caproic acid, methanethiol, dimethylsulfide, dimethyl disulfide, dimethyl trisulfide, and methylpropyl sulfide.

27. The method of claim 20, wherein the fluid comprises a plurality of malodorous VOC by-products, wherein upon the contact, the amine groups of the second polymer react with the functionality of multiple malodorous VOC by-products of the plurality.

28. The method of claim 20, wherein upon the contact, about 75% or more of the malodorous VOC by-product contained in the fluid is sequestered and/or modified.

29. The method of claim 20, wherein the biodegradable polymer comprises a polysaccharide.

* * * * *